(12) United States Patent  
Gan et al.

(10) Patent No.: US 8,502,759 B2  
(45) Date of Patent: Aug. 6, 2013

(54) LIGHT MODULATION ELEMENT, DRIVING METHOD AND DRIVE APPARATUS

(75) Inventors: Taijyu Gan, Kanagawa (JP); Hiroshi Arisawa, Kanagawa (JP); Haruo Harada, Kanagawa (JP); Chisato Urano, Kanagawa (JP); Makoto Gomyo, Kanagawa (JP); Yasunori Okano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1487 days.

(21) Appl. No.: 11/896,704

(22) Filed: Sep. 5, 2007

(65) Prior Publication Data

US 2008/0192157 A1      Aug. 14, 2008

(30) Foreign Application Priority Data

Feb. 14, 2007    (JP) .................. 2007-033244

(51) Int. Cl.  
*G09G 3/36* (2006.01)
(52) U.S. Cl.  
USPC .................. 345/87; 345/94; 349/33
(58) Field of Classification Search  
USPC ............... 345/87–100, 204, 208–210; 349/2, 349/25, 33, 169, 175  
See application file for complete search history.

(56) References Cited

U.S. PATENT DOCUMENTS

| | | | |
|---|---|---|---|
| 4,435,047 A | 3/1984 | Fergason | |
| 5,130,830 A * | 7/1992 | Fukushima et al. | 349/123 |
| 6,067,135 A | 5/2000 | Shimizu et al. | |
| 6,163,348 A * | 12/2000 | Izumi et al. | 348/761 |
| 6,600,473 B1 * | 7/2003 | Kobayashi et al. | 345/97 |
| 2002/0005827 A1 * | 1/2002 | Kobayashi | 345/87 |
| 2003/0081304 A1 * | 5/2003 | Harada et al. | 359/294 |
| 2004/0119933 A1 | 6/2004 | Harada et al. | |
| 2005/0007531 A1 * | 1/2005 | Okada et al. | 349/129 |

FOREIGN PATENT DOCUMENTS

| | | |
|---|---|---|
| JP | B2 7-9512 | 2/1995 |
| JP | A 9-120045 | 5/1997 |
| JP | A 9-236791 | 9/1997 |
| JP | A 11-237644 | 8/1999 |
| JP | B2 3178530 | 4/2001 |
| JP | A-2004-198949 | 7/2004 |
| JP | A-2005-196062 | 7/2005 |

OTHER PUBLICATIONS

Japanese Office Action issued in Japanese Application No. 2007-033244 dated Apr. 17, 2012 (w/ Translation).  
Jan. 31, 2012 Japanese Office Action issued in Japanese Patent Application No. 2007-033244 (with translation).

* cited by examiner

*Primary Examiner* — Regina Liang  
(74) *Attorney, Agent, or Firm* — Oliff & Berridge, PLC

(57) ABSTRACT

A method for driving a light modulation element includes: applying light to the light modulation element in accordance with an image to be displayed on the light modulation element while applying a DC voltage between a pair of electrode layers of the light modulation element; and applying a pulse voltage having an opposite polarity to the DC voltage applied so far between the pair of electrode layers with the light being applied, and terminating the applying of the light when the applying of the pulse voltage is terminated. The applying of the light, the applying of the pulse voltage and the terminating of the applying of the light are executed sequentially.

8 Claims, 7 Drawing Sheets

VOLTAGE WAVEFORM OF LIGHT MODULATION LAYER 7 IN COMPARATIVE EXAMPLE

SPECTRAL REFLECTION SPECTRUM OF LIGHT MODULATION LAYER 7 IN COMPARATIVE EXAMPLE

VOLTAGE WAVEFORM OF LIGHT MODULATION
LAYER 7 IN EXAMPLE (BRIGHT PART)

VOLTAGE WAVEFORM OF LIGHT MODULATION
LAYER 7 IN EXAMPLE (DARK PART)

SPECTRAL REFLECTION SPECTRUM OF LIGHT
MODULATION LAYER 7 IN EXAMPLE (BRIGHT PART)

SPECTRAL REFLECTION SPECTRUM OF LIGHT
MODULATION LAYER 7 IN EXAMPLE (DARK PART)

(A) PLANAR (B) FOCAL CONIC (C) HOMEOTROPIC

LIGHT MODULATION ELEMENT, DRIVING METHOD AND DRIVE APPARATUS

CROSS-REFERENCE TO RELATED APPLICATIONS

This application is based on and claims priority under 35 U.S.C. §119 from Japanese Patent Application No. 2007-33244 filed Feb. 14, 2007.

BACKGROUND

1. Technical Field

The invention relates to a light modulation element, its driving method and a driving apparatus.

2. Related Art

Various rewritable marking techniques which are highly convenient have been researched. As one direction, in recent years, attention has been focused on a display element using cholesteric liquid crystal because it has features such as a memory property capable of retaining display without power supply, capability of providing bright display because of using no polarizing plate, and capability of producing color display without using any color filter.

A planar texture exhibited by cholesteric liquid crystal (chiral nematic liquid crystal) causes a selective reflection phenomenon to occur in which light incident in parallel with a helical axis is separated into right optical rotation and left optical rotation, a circular polarization component matching a twist direction of the helical axis is Bragg-reflected, and the remaining light is allowed to pass through. Let a helical pitch be p, average refractive index in a plane orthogonal to the helical axis be n, and complex refractive index be $\Delta n$, center wavelength $\lambda$ of reflected light and reflection wavelength width $\Delta \lambda$ are represented as $\lambda = n \times p$ and $\Delta \lambda = \Delta n \times p$, respectively. Reflected light caused by the cholesteric liquid crystal in the planar texture exhibits vivid color dependent on the helical pitch.

The cholesteric liquid crystal having positive dielectric constant anisotropy exhibits three states of (i) a planar texture in which the helical axis becomes perpendicular to the cell surface and the selective reflection phenomenon is caused to occur for incident light as shown in FIG. 10(A), (ii) a focal conic texture in which the helical axis becomes almost parallel to the cell surface and incident light is allowed to pass through while it is forward scattered a little as shown in FIG. 10(B), and (iii) a homeotropic texture in which the helical structure comes loose and liquid crystal director is oriented in the electric-field direction for allowing incident light to pass through almost completely as shown in FIG. 10(C).

Of these three states, the planar texture and the focal conic texture can exist bistably without electric field. Therefore, the texture state of the cholesteric liquid crystal is not uniquely determined with respect to an intensity of the electric field applied to a liquid crystal layer. If the planar texture is an initial state, the state changes in order of the planar texture, the focal conic texture, and the homeotropic texture with an increase in intensity of the electric field. If the focal conic texture is the initial state, the state changes in order of the focal conic texture and the homeotropic texture with an increase in intensity of the electric field.

On the other hand, if the intensity of the electric field applied to the liquid crystal layer is set to zero suddenly, the planar texture and the focal conic texture maintain the state intact and the homeotropic texture changes to the planar texture.

Therefore, the cholesteric liquid crystal layer just after a pulse signal is applied thereto exhibits switching behavior as shown in FIG. 11. When a voltage of the applied pulse signal is Vfh or more, the cholesteric liquid crystal enters the selective reflection state in which the homeotropic texture has changed to the planar texture. When the voltage is between Vpf and Vfh, the cholesteric liquid crystal is in a transmission state due to the focal conic texture. When the voltage is Vpf or less, a state of the cholesteric liquid crystal before the pulse signal is applied is continued, namely, the cholesteric liquid crystal is in the selective reflection state due to the planar texture or the transmission state due to the focal conic texture.

In FIG. 11, the vertical axis is normalized light reflectivity. The light reflectivity is normalized so that the maximum light reflectivity is set to 100 and the minimum light reflectivity is set to 0. Since a transition region exists among the states of the planar texture, the focal conic texture, and the homeotropic texture, the case where the normalized light reflectivity is 50 or more is defined as a selective reflection state and the case where the normalized light reflectivity is less than 50 is defined as a transmission state. Also, a threshold voltage of texture change between the planar texture and the focal conic texture is denoted by Vpf, and a threshold voltage of texture change between the focal conic texture and the homeotropic texture is denoted by Vfh.

FIG. 12 is a drawing to schematically show a state in which an image is written to a display element with a light irradiation device. As shown in FIG. 12, in the display element a display layer, which is a liquid crystal layer, and an organic photosensitive layer, which is a photoconductive layer, are deposited between a pair of transparent electrodes (with sandwiching a shading layer (not shown), if necessary). The photoconductive layer consists of a charge generation layer, a charge transportation layer and another charge generation layer, and the charge generation layers sandwich the charge transportation layer therebetween. Also, a pair of substrates sandwich the display layer, the photosensitive layer and the transparent electrodes. The surface on a side of the organic photosensitive layer is exposed to image light by an exposure device in a state where a certain voltage is applied to both the transparent electrodes. Thereby, any desired record image can be written therein.

With this display element, if units in each of which the display layer and the photoconductive layer are sandwiched between the electrode layers are deposited as three colors of R, G, and B, a full color image can also be formed.

SUMMARY

According to an aspect of the invention, a light modulation element includes a pair of electrode layers, a display layer containing cholesteric liquid crystal that reflects or transmits light in response to a texture state of the cholesteric liquid crystal, and a photoconductive layer. The photoconductive layer includes a charge generation layer and a charge transport layer deposited on each other without one of the charge generation layer and the charge transport layer sandwiching the other. The display layer and the photoconductive layer are disposed between the electrode layers. A method for driving the light modulation element includes: applying light to the light modulation element in accordance with an image to be displayed on the light modulation element while applying a DC voltage between the pair of electrode layers of the light modulation element; applying a pulse voltage having an opposite polarity to the DC voltage applied so far between the pair of electrode layers with the light being applied; and terminating the applying of the light when the applying of the pulse voltage is terminated. The applying of the light, the applying of the pulse voltage and the terminating of the applying of the light are executed sequentially.

BRIEF DESCRIPTION OF THE DRAWINGS

Exemplary embodiments of the invention will be described below in detail with reference to the accompanying drawings, wherein.

DETAILED DESCRIPTION

Exemplary embodiments of a light modulation element, its driving method and a driving apparatus will be described in detail with reference to the accompanying drawings.

Figure 1:
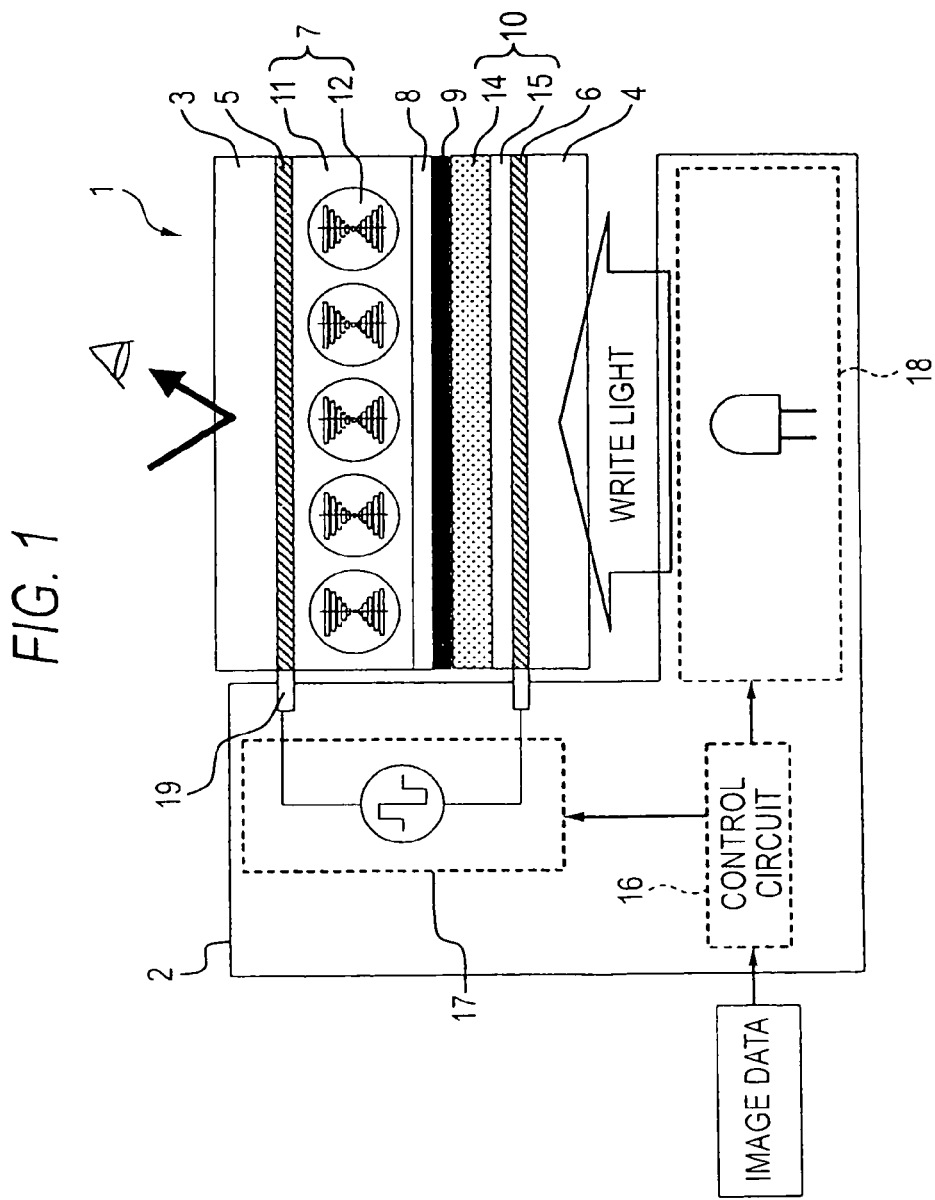
FIG. 1 is a schematic configuration drawing to show an illustrative form of a system containing the entire light modulation element and a driving apparatus according to an exemplary embodiment of the invention.

FIG. 1 is a schematic configuration drawing of an embodiment of an illustrative form of a system containing the entire light modulation element and the driving apparatus. The system according to the exemplary embodiment includes a light modulation element 1 and a driving apparatus 2. Both the components will be described in detail, and then its operation (driving method) will be described.

<Light Modulation Element>

In the exemplary embodiment, the light modulation element 1 has a substrate 3, an electrode 5, a light modulation layer 7, a laminate layer 8, a colored layer (shading layer) 9, an organic photosensitive layer (photoconductive layer) 10, an electrode (electrode layer) 6, and a substrate 4 deposited in order from the display surface.

(Substrate)

The substrates 3 and 4 are members intended for holding the functional layers inside and maintaining the structure of the display element. Each of the substrates 3 and 4 is a sheet-shaped substance having a strength enduring an external force and may have flexibility. As a specific material, an inorganic sheet (for example, glass, silicon), a polymer film (for example, polyethylene terephthalate, polysulfone, polyethersulfone, polycarbonate, polyethylene naphthalate), etc., can be named. At least, the substrate 3 on the display-surface side has a function of transmitting display light. A known functional film such as a dirt prevention film, a wear resistance film, a light reflection prevention film and/or a gas barrier film may be formed on an outside surface of the substrate 3.

(Electrode)

The electrodes (electrode layers) 5 and 6 are members intended for applying voltage, which is applied from a voltage application section 17, to the functional layers in the light modulation element 1. Specifically, a conductive thin film formed of metal (for example, gold, silver, copper, iron, aluminum), a metal oxide (for example, indiumoxide, tin oxide, indium tin oxide (ITO)), carbon, a complex having them dispersed in a polymer, a conductive organic polymer (for example, polythiophen base, polyaniline base), etc., can be named as the electrodes. The electrodes 5, 6 may be formed on those surfaces with a known functional film such as an adhesion improvement film, a light reflection prevention film and/or a gas barrier film.

(Light Modulation Layer)

In the exemplary embodiment, the light modulation layer has a function of modulating a reflection/transmission state of incident light depending on an electric field using change in a light interference state of cholesteric (chiral nematic) liquid crystal. The light modulation layer also has a nature of being capable of holding the selection state even without electric field. The light modulation layer may have a structure which is not deformed due to an external force such as bend and pressure.

In the exemplary embodiment, a liquid crystal layer of a self-holding type liquid crystal complex made up of cholesteric liquid crystal and a transparent resin is formed as the light modulation layer. That is, it is a liquid crystal layer which does not require a spacer, because it has a self-hold property as a complex. In the exemplary embodiment, cholesteric liquid crystal is dispersed in a polymer matrix (transparent resin) although not shown in the figure.

In the exemplary embodiment, it is not necessary that the light modulation layer is a liquid crystal layer of a self-holding type liquid crystal complex. The light modulation layer may be formed of liquid crystal only, of course.

The cholesteric liquid crystal has a function of modulating a reflection/transmission state of specific color light in incident light and has liquid crystal molecules, which are oriented with helically twisted. The cholesteric liquid crystal executes interference reflection of specific light dependent on the helical pitch, of light incident from the helical axis direction. An electric field can change the orientation to thereby change the reflection state. When the light modulation layer is formed of a self-holding type liquid crystal complex, the cholesteric liquid crystal may be placed as a monolayer densely with uniform drop sizes.

As specific liquid crystal that can be used as cholesteric liquid crystal, a steroid base cholesterol derivative or nematic liquid crystal or smectic liquid crystal (for example, Schiff base, azo base, azoxy base, benzoate base, biphenyl base, terphenyl base, cyclohexyl carboxylate base, phenyl cyclohexane base, biphenyl cyclohexane base, pyrimidine base, dioxane base, cyclohexyl cyclohexane ester base, cyclohexyl ethane base, cyclohexane base, tran base, alkenyl base, stilbene base, polycyclic base) or substance provided by adding to a mixture thereof, a chiral agent (for example, steroid base cholesterol derivative, Schiff base, azo base, ester base, biphenyl base), and the like can be named.

The helical pitch of the cholesteric liquid crystal is adjusted according to the chemical structure of a liquid crystal molecule and the addition amount of a chiral agent to the nematic liquid crystal. For example, to set the display color to blue, green, or red, the center wavelength of selective reflection is placed in the range of 400 nm to 500 nm, the range of 500 nm to 600 nm, or the range of 600 nm to 700 nm. To compensate for the temperature dependency of the helical pitch of the cholesteric liquid crystal, a known technique of adding a plurality of chiral agents different in twist direction or showing inverse temperature dependency may be used.

As a form wherein the light modulation layer 7 forms a self-holding type liquid crystal complex made up of cholesteric liquid crystal and a polymer matrix (transparent resin), a PNLC (Polymer Network Liquid Crystal) structure wherein network resin is contained in the continuous texture of the cholesteric liquid crystal or a PDLC (Polymer Dispersed Liquid Crystal) structure wherein the cholesteric liquid crystal is dispersed like droplets in the skeleton of the polymer (containing a polymer dispersed microencapsulated liquid crystal structure) can be used and the PNLC structure or the PDLC structure is adopted, whereby an anchoring effect is produced on the interface between the cholesteric liquid crystal and the polymer and the hold state of the planar texture or the focal conic texture in no electric field can be more stabilized.

The PNLC structure and the PDLC structure can be formed according to a known method of executing texture separation of polymer and liquid crystal, for example, a PIPS (Polymerization Induced Texture Separation) method of mixing a polymer precursor polymerized by heat, light, an electron ray, etc., such as acrylic base, thiol base, or epoxy base, and liquid crystal and polymerizing from the state of a uniform texture for texture separation, an emulsion method of mixing a polymer low in liquid crystal solubility such as polyvinyl alcohol and liquid crystal and executing agitation suspension for dispersing the liquid crystal in the polymer like droplets, a TIPS (Thermally Induced Texture Separation) method of mixing a thermoplastic polymer and liquid crystal and cooling from a heated state to a uniform texture for texture separation, an SIPS (Solvent Induced Texture Separation) method of dissolving a polymer and liquid crystal in a solvent of chloroform, etc., and evaporating the solvent for texture separation of the polymer and the liquid crystal, or the like, but the method is not limited.

The polymer matrix has a function of holding cholesteric liquid crystal and suppressing fluid flow of liquid crystal (image change) caused by deformation of a display element, and a polymer material not dissolving in liquid crystal material and with liquid not mutually solved in liquid crystal as a solvent is used preferably. It is desirable that a material having a strength enduring an external force and showing high transmission at least for reflected light and write light should be used as the polymer matrix.

As the material that can be adopted as the polymer matrix, a water-soluble polymer material (for example, gelatin, polyvinyl alcohol, cellulose derivative, polyacrylic polymer, ethyleneimine, polyethylene oxide, polyacrylamide, polystyrene sulfonate, polyamidine, isoprene base sulfonic acid polymer) or a material that can be put into water-based emulsion (for example, fluorocarbon resin, silicone resin, acrylic resin, urethane resin, epoxy resin), etc., can be named.

The switching (hysteresis) behavior of the display layer 7 can be controlled based on the dielectric constant anisotropy of cholesteric liquid crystal 12 forming the display layer 12, the elastic coefficient, the helical pitch, the skeleton and side chain of polymer, texture separation process, morphology of the interface between a polymer matrix 11 and the display layer 7, the degree of the anchoring effect on the interface between the polymer matrix 11 and the display layer 7 determined by the total of the above-mentioned factors.

More specifically, it can be controlled by the type and composition ratio of nematic liquid crystal, the type of chiral agent, the type of resin, the type and composition ratio of monomer, oligomer, initiator, crosslinking agent, etc., of starting substance of polymer resin, polymerization temperature, exposure light source, exposure strength, exposure time, and ambient temperature for photo polymerization, electron beam strength, exposure time, and ambient temperature for electron beam polymerization, the type and composition ratio of solvent at the applying time, solution concentration, wet film thickness, dry temperature, starting temperature and temperature drop speed when temperature drops, and the like can be named, but the control factors are not limited to them.

(Organic Photosensitive Layer)

The organic photosensitive layer (photoconductive layer) 10 is a layer having an internal photoelectric effect and having such a characteristic that its impedance characteristic changes in response to an irradiation intensity of write light. In the exemplary embodiment, as the organic photosensitive layer 10, a charge transport layer 14 and a charge generation layer 15 are deposited in order from an upper layer in FIG. 1.

In the exemplary embodiment, it is not necessary that a single tone charge generation layer (CGL) and a single charge transport layer (CTL) are deposited. Two or more layers of either or both of those layers may be deposited. In this case, however, one layer is not sandwiched between other layers. That is, CGL or CTL may be deposited consecutively. In this case, the whole deposited CGL or the whole deposited CTL can be regarded as a single CGL or CTL. Therefore, if CGL or CTL is actually made up of two or more layers, it may be simply represented as "a single layer." Also, when CGL and CTL are deposited, they may be referred to as "two layers."

The charge generation layer 15 is a layer having a function of absorbing write light and generating a photocarrier. The charge generation layer 15 may be a layer capable of absorbing write light, generating an exciton, and efficiently separating to a free carrier in CGL or on the interface between CGL and CTL.

The charge generation layer 15 can be formed by a dry method of directly forming a film of a charge generation material (for example, metal or non-metal phthalocyanine, squalium compound, azulenium compound, perylene pigment, indigoid pigment, azo pigment such as bis and tris, quinacridone pigment, pyrrolo pyrrole dye, polycyclic quinone pigment, reduced cyclic aromatic based pigment such as dibromo ant anthrone, cyanine dye, xanthene pigment, charge transfer complex such as polyvinyl carbazole and nitro fluorine, eutectic complex made up of pyrylium salt dye and polycarbonate resin) or a wet applying method of preparing application liquid by dispersing or dissolving the charge generation materials in a proper solvent together with a polymer binder (for example, polyvinyl butyral resin, polyallylate resin, polyester resin, phenol resin, vinyl carbazole resin, vinyl formal resin, partial denaturation vinyl acetal resin, carbonate resin, acrylic resin, vinyl chloride resin, styrene resin, vinyl acetate resin, vinyl acetate resin, silicone resin, etc.), applying the liquid, and drying it to form a film.

The charge transport layer 14 is a layer into which the photocarrier generated in the charge generation layer 15 is injected, and has a function of drifting the photocarrier in a direction of an electric field applied by a bias signal.

Preferably, in the charge transport layer 14, free carrier is injected from the charge generation layer 15 efficiently (the charge transport layer 14 may have an ionization potential close to that of the charge generation layer 15) and the injected free carrier makes a hopping move at high speed as much as possible. To increase the impedance at the dark time, preferably dark current based on heat carrier is lower.

The charge transport layer 14 may be formed by preparing a substance obtained by dispersing or dissolving a low-molecular hole transport material (for example, trinitro fluorine base compound, polyvinyl carbazole base compound, oxadiazole base compound, hydrazone base compound such as benzyl amino base hydrazone or quinoline base hydrazone, stilbene base compound, triphenyl amine base compound, triphenyl methane base compound, benzidine base compound) or low-molecular electron transport material (for example, quinone base compound, tetra cyano kino dimetan base compound, flu fleuron compound, xanthone base compound, benzophenone base compound) in a proper solvent together with a polymer binder (for example, polycarbonate resin, polyallylate resin, polyester resin, polyimide resin, polyamide resin, polystyrene resin, silicon-containing crosslink type resin, etc.) or a substance obtained by dispersing or dissolving a material provided by the polymerized hole transport material or polymerized electron transport material in a proper solvent, applying the substance, and drying it.

(Colored Layer)

The colored layer (shading layer) 9 is a layer intended to optically separate write light and incident light during writing for preventing malfunction caused by mutual interference and to optically separate external light incident from the non-display-surface side of the display element and a display image during displaying for preventing degradation of the image quality. It is noted that the colored layer 9 is not an indispensable component in this exemplary embodiment. However, for the purpose of enhancing property of the light modulation element 1, it is desired to provide the color layer 9. From its purpose, the colored layer 9 is required to have a function of absorbing at least light in the absorption wave range of the charge generation layer and light in the reflected wave range of the light modulation layer.

The colored layer 9 specifically can be formed by a wet applying method of preparing application liquid by dispersing or dissolving inorganic pigment (for example, cadmium base, chromium base, cobalt base, manganese base, caron base) or organic dye or organic pigment (for example, azo base, anthraquinone base, indigo base, triphenylmethane base, nitro base, phthalocyanine base, perylene base, pyrrolo pyrrole base, quinacridone base, polycyclic quinone base, squarerium base, azurenium base, cyanine base, pyririum base, anthrone base) in a proper solvent together with a polymer binder (for example, polyvinyl alcohol resin, polyacrylic resin, etc.), applying the liquid to the face of the organic photosensitive layer 10 on the side of the charge generation layer 15, and drying it to form a film.

(Laminate Layer)

The laminate layer 8 is a layer intended to absorb roughness and to adhere when the functional layers formed inside the upper and lower substrates 3 and 4 are put on each other. It is noted that the laminate layer 8 is not an indispensable component in the exemplary embodiment. The laminate layer 8 is formed of a thermoplastic organic material, a thermosetting organic material, or an organic material of mixed type thereof. A material capable of causing the light modulation layer 7 and the colored layer 9 closely adhering or adhering to each other by heat and pressure is selected. The laminated layer 8 is required to have at least a transmission property of incident light.

As an appropriate material for the laminate layer 8, an adhesive polymeric material (for example, polyethylene base, polypropylene base, polyurethane base, epoxy base, acrylic base, rubber base, silicone base) can be named.

(Contact Terminal)

A contact terminal 19 is a member for coming in contact with the voltage application section 17 and the light modulation element 1 (electrode layer 5, 6) and bringing them in a conduction state. A material having high electric conductivity and having small contact resistance with respect to the electrode layer 5, 6 and the voltage application section 17 is selected. The contact terminal 19 may have such a structure that can be detached from the electrode layer 5, 6 so that the light modulation element 1 and the driving apparatus 2 can be separated.

As the contact terminal 19, a terminal which is made of metal (for example, gold, silver, copper, iron, aluminum), carbon, a complex having them dispersed in a polymer, a metal oxide (for example, indium oxide, tin oxide, indium tin oxide (ITO)), carbon, a complex having them dispersed in a polymer, a conductive organic polymer (for example, polythiophen base, polyaniline base), etc., and which has a clip connector shape for clipping the electrode can be named.

<Driving Apparatus>

In the exemplary embodiment, the driving apparatus (the driving apparatus for light modulation element 1) 2 is a device for writing an image to the light modulation element 1. The driving apparatus 2 has a light irradiation section (light application unit) 18 for applying write light to the light modulation element 1 and the voltage application section (voltage application unit) 17 for applying a voltage to the light modulation element 1 as main components. The driving apparatus 2 also includes a control section 16 for controlling operation of the components 17 and 18.

(Light Irradiation Section)

The light irradiation section (light application unit) 18 is not limited so long as it has a function of applying imagewise write light pattern to the light modulation element 1 and can apply any desired light image pattern (spectrum, strength, spatial frequency) to the light modulation element 1 (particularly, the organic photosensitive layer 10) based on an input signal from the control section 16. It is not necessary that an area to be irradiated with light is the entire write surface of the light modulation element 1, and the area may be within a range where the light modulation layer is formed, of course, and needs only to be in an area to be written (writing area).

The write light irradiated by the light irradiation section 18 satisfying the following conditions may be selected. However, the write light is not limited thereto.

Spectrum: Energy in the absorption wave range of the organic photosensitive layer 10 is large as much as possible.

Irradiation intensity: Such an intensity that at the bright time, a voltage applied to the light modulation layer 7 becomes equal to or greater than the voltage of the upper or lower threshold value due to voltage division with the organic photosensitive layer 10 and orientation of the liquid crystal in the light modulation layer 7 is changed and that at the dark time, the applied voltage becomes less than the voltage of the upper or lower threshold value.

The write light applied by the light irradiation section 18 may be light having a peak intensity in the absorption wave range of the organic photosensitive layer 10 and a narrow bandwidth as much as possible.

As the light irradiation section 18, specifically the following can be named:

(1-1) A section capable of forming any desired two-dimensional light emission pattern by scanning operation, such as one formed by arranging light sources one-dimensionally in an array shape or one formed by combining a light source and a polygon mirror (1-2) A combination of (i) a uniform light source such as one formed by arranging light sources in an array shape or a combination of a light source and a light guide plate and (ii) a light adjustment element for generating a light pattern (for example, LCD, photo mask, etc.)

(2) Self-luminous type display such as one formed by arranging light sources in a plane shape (for example, CRT, PDP, EL, light emitting diode, FED, SED)

(3) A combination of (i) (1-1), (1-2), or (2) and (ii) an optical element (for example, microlens array, cell hook lens array, prism array, viewing angle adjustment sheet)

(Voltage Application Section)

The voltage application section (voltage application unit) 17 may be any so long as it has a function of applying a predetermined applied voltage at the writing time (drive voltage. Hereinafter, it may be referred to simply as "bias voltage") to the light modulation element 1 and can apply any desired voltage waveform to the display element (between the electrodes) based on an input signal from the control section 16. It may have a high through rate. For example, a bipolar high-voltage amplifier, etc., may be used as the voltage application section 17.

The voltage application section 17 applies voltage to the light modulation element 1 between the electrodes 5 and 6 through the contact terminal 19.

(Control Circuit)

The control section 16 is a member having a function of appropriately controlling the operation of the voltage application section 17 and the light irradiation section 18 in response to image data from an external apparatus (an image capture apparatus, an image receiver, an image processing apparatus, an image reproduction apparatus, an apparatus having the functions of the above apparatuses, or the like). The specific control executed by the control section 16 includes two steps, that is, "writing step" and "pulse voltage applying step" and will be described later in detail.

<Driving Method>

The light modulation element 1 is provided by forming, as the light modulation layer 7, the liquid crystal layer of the self-holding type liquid crystal complex made up of the cholesteric liquid crystal 12 and the polymer matrix 11 as described above. The light modulation element 1 of the exemplary embodiment uses the bistable phenomenon of the cholesteric liquid crystal to be switched between (A) a selective reflection state based on the planar texture and (B) a transmission state based on the focal conic texture, by the light irradiation section 18 while the voltage application section 17 is applying a predetermined voltage. Thereby, a display image having a memory property in no electric field is written.

In the exemplary embodiment, the writing step of applying write light while applying a bias voltage between the pair of electrodes 5 and 6 and the pulse voltage applying step of applying a termination pulse between the electrodes 5 and 6 while the applying of the write light being held and terminating the write light irradiation are performed in order as a basic operation.

(Writing Step)

In the writing step, while the voltage application section 17 applies a DC bias voltage between the pair of electrodes 5 and 6, the light irradiation section 18 applies the write light to the light modulation element 1. At this time, as an initialization time period, first only a bias voltage may be applied and a voltage ratio applied to the light modulation layer and the organic photosensitive layer is relaxed to resistance divided voltage and while the state is maintained, the light modulation element 1 is irradiated with write light.

The switching behavior change of the light modulation layer 7 at the exposure time and at the non-exposure time in the exemplary embodiment will be described with reference to a graph shown in FIG. 11.

Figure 10:
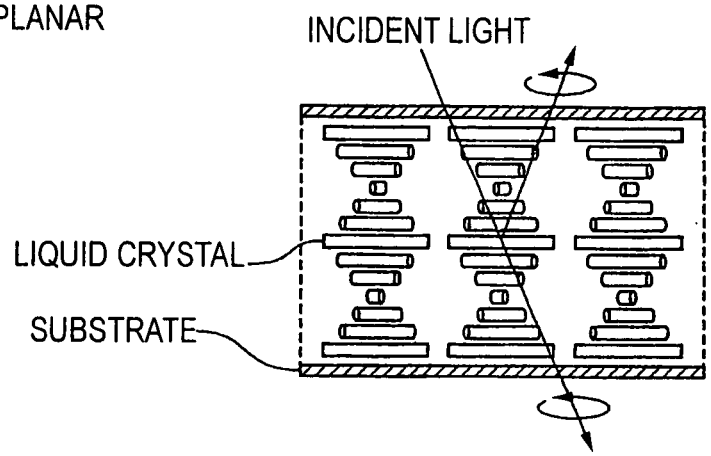
FIG. 10 is a schematic representation to show a relationship between a molecular orientation and optical characteristic of cholesteric liquid crystal; (A) shows the relationship in the planar texture; (B) shows the relationship in the focal conic texture; and (C) shows the relationship in the homeotropic texture.
Figure 10:
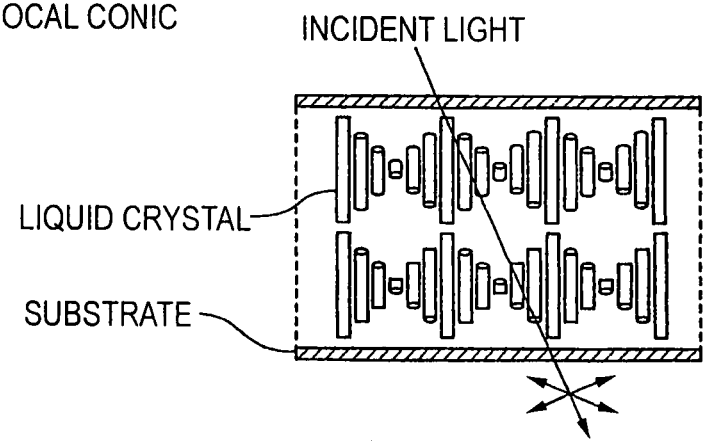
Figure 10:
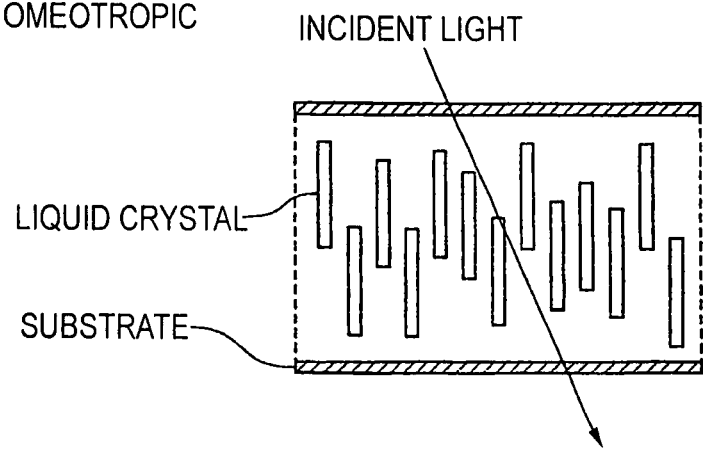

In response to the magnitude of the externally applied voltage, the liquid crystal changes to the planar texture, focal conic texture, and homeotropic texture if the planar texture or the homeotropic texture is the initial state or changes to the focal conic texture and the homeotropic texture if the focal conic texture is the initial state. When the final state is the planar texture or the focal conic texture, the texture is maintained still after the applied voltage is removed. If the final state is the homeotropic texture, the texture changes to the planar texture as shown in FIG. 11. Therefore, the planar texture or the focal conic texture is selected as the final texture state according to the magnitude of the applied voltage regardless of exposure or non-exposure. The planar texture causes the light reflection state and the focal conic texture causes the light transmission state as shown in FIG. 10.

Figure 11:
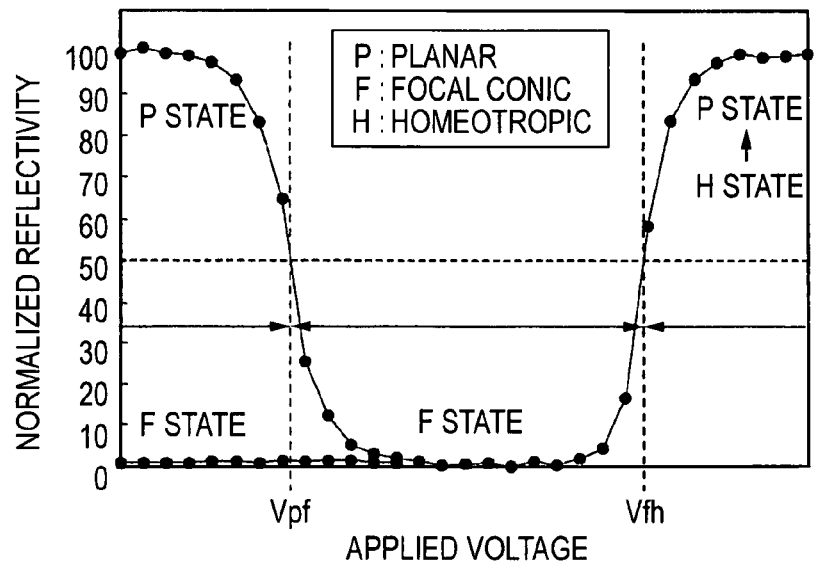
FIG. 11 is a graph to describe switching behavior of cholesteric liquid crystal.
Figure 12:
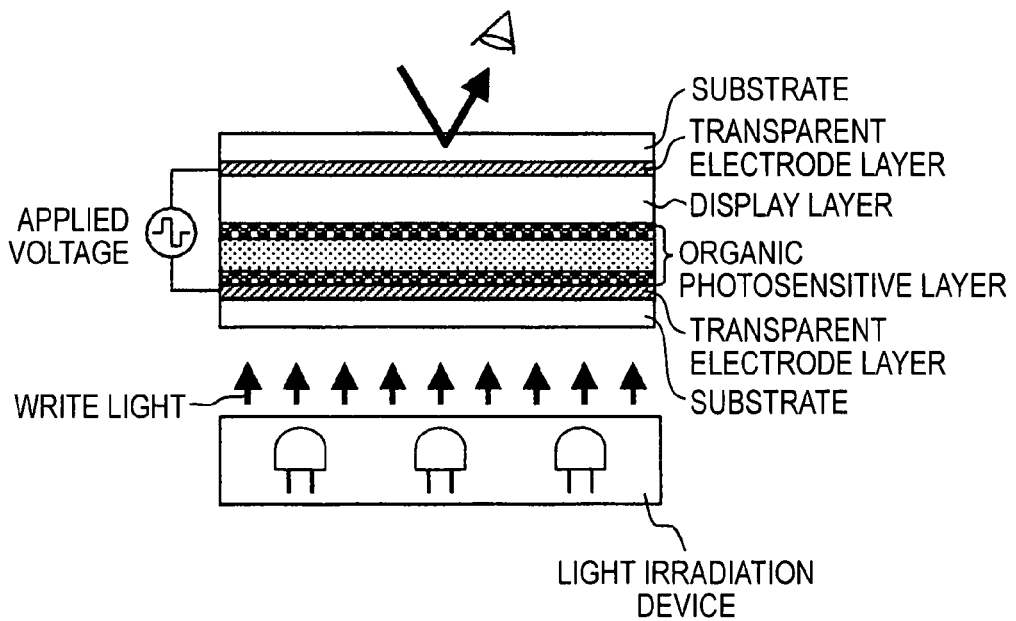
FIG. 12 is a schematic drawing to schematically show a state in which an image is written to a general display element of a related art with a light irradiation device.

The graph of FIG. 11 shows that as the externally applied voltage on the horizontal axis increases, the state of the display layer (liquid crystal layer) changes to the planar texture, the focal conic texture, and the homeotropic texture (finally, the homeotropic texture to the planar texture) or changes to the focal conic texture and the homeotropic texture (finally, the homeotropic texture to the planar texture). Accordingly, the reflectivity on the display surface (in FIG. 1, a reflectivity of incident light from the substrate 3 side) changes. The voltage at which each texture change occurs is called "threshold value." Particularly, the threshold value for the texture change from the planar texture to the focal conic texture is called "threshold value on low voltage side" and the threshold value for the texture change from the focal conic texture to the homeotropic texture is called "threshold value on high voltage side." The former is represented by a symbol of Vpf and the latter is represented by a symbol of Vfh in the graph of FIG. 11.

In the exemplary embodiment, the threshold value on the high voltage side is used as the threshold value of the texture change at the image writing time. That is, first in the non-exposure state, a DC voltage corresponding to a magnitude which is Vpf or more and Vfh or less is applied, the texture of a portion where a previous image of the light modulation layer 7 is in a reflection state is changed from the planar texture to the focal conic texture, the entire surface is set (initialized) to the focal conic texture, and the voltage ratio applied to the light modulation layer and the organic photosensitive layer is relaxed to resistance divided voltage. Then, while the voltage state is maintained, the light irradiation section 18 applies imagewise write light to the light modulation element 1.

In this manner, when the writing step is executed, the non-exposed part is in a state where its potential is equal to or more than the threshold value Vpf on the low voltage side and is equal or less than the threshold value Vfh on the high voltage side. Therefore, the texture remains in the focal conic texture. On the other hand, the exposed part exceeds the threshold value Vfh on the high voltage side and the texture changes from the focal conic texture to the homeotropic texture. Thus, an image is written with the exposed part being selected.

In the exemplary embodiment, the applied voltage is DC voltage. In a symmetrical three-layer organic photosensitive layer having a charge transport layer sandwiched between two charge generation layers, as AC voltage is applied, the photocarriers generated in the charge generation layers are moved alternately for ensuring photoconductivity. To the contrary, in the organic photosensitive layer 10 of a single-polarity structure having the single charge transport layer 14 and the single charge generation layer 15 deposited on each other, the photocarrier generated in the charge generation layer 15 is moved in one direction to the charge transport layer 14 side.

Since the DC voltage is used as the applied voltage at the writing time, light energy for causing only one charge generation layer to produce a photocarrier is sufficient. The applied light amount required for writing can be reduced (can be about halved theoretically) as compared with the case where the three-layer photoconductive layer having a charge transport layer sandwiched between charge generation layers and AC voltage is applied as bias voltage.

Figure 2:
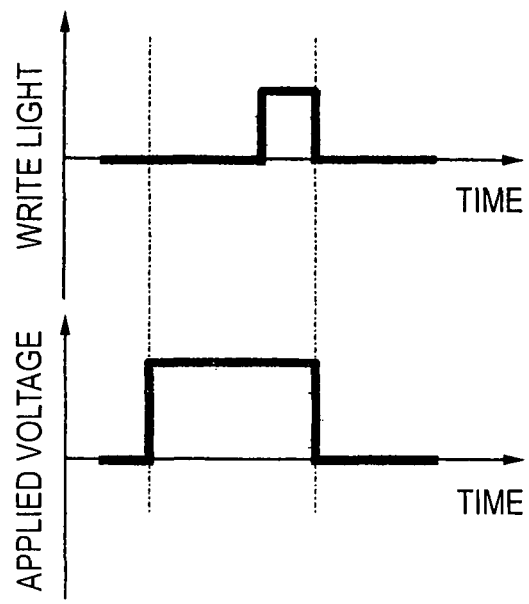
FIG. 2 is a chart to show a voltage and an intensity of write light on a time series for an example of a driving method that does not contain a termination pulse step.

However, since the applied voltage is DC voltage as shown in FIG. 2, the moved photocarrier is stored between the charge transport layer 14 and the light modulation layer 7. If the application of the voltage and the irradiation of the write light are terminated and the electric field is set to zero, a discharge current in an opposite direction occurs. FIG. 2 is a chart to show applied voltage and an intensity of write light to the light modulation element 1 on a time series basis.

Figure 4:
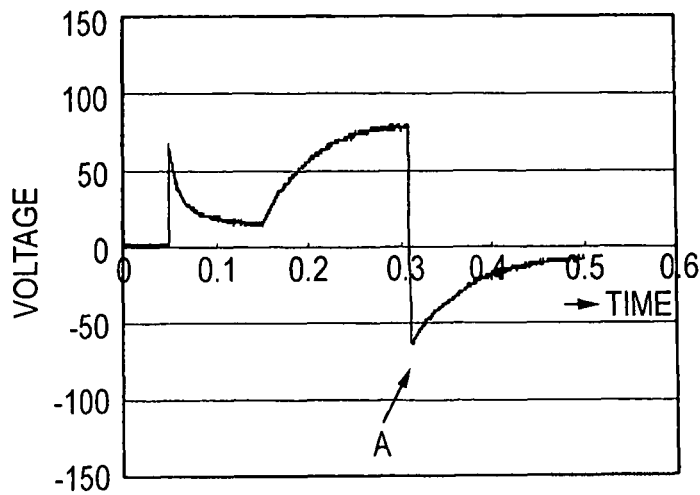
FIG. 4 is a graph to show voltage applied to a light modulation layer (vertical axis) on a time series as an evaluation test result of a comparative example.

Referring to FIG. 4 of a graph to show the evaluation result of a comparative example described later, if the application of the bias voltage is terminated as it is, a peak voltage having the opposite polarity to the DC voltage applied until just before the termination occurs in the light modulation layer 7 as indicated by the arrow A in the graph. If a waveform at a time the applied voltage becomes zero is disordered, the texture change of the cholesteric liquid crystal from the homeotropic texture to the planar texture is hindered and thus it becomes difficult to bring the cholesteric liquid crystal into the reflection state. Thus, a high-contrast image cannot be written into the light modulation element of the exemplary embodiment simply by setting the applied voltage to DC in the writing step.

Then, the operation of the pulse voltage applying step which aggressively uses a discharge current is executed following the writing step.

(Pulse Voltage Applying Step)

Figure 3:
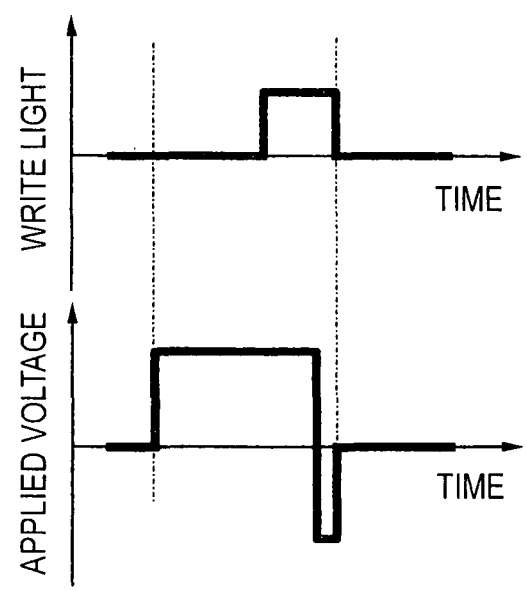
FIG. 3 is a chart to show voltage applied to the light modulation element and an intensity of write light applied to the light modulation element on a time series for an example of the driving method that contains the termination pulse step.

In the pulse voltage applying step, while irradiation of light by the light irradiation section 18 in the writing step is continued, a single pulse voltage (termination pulse) having the opposite polarity to the DC voltage applied so far (bias voltage) is applied between the pair of electrodes 5 and 6. Then, the irradiation of the light is terminated together with termination of the application of the pulse voltage. FIG. 3 is a chart to show the voltage applied to the light modulation element 1 and an intensity of the write light applied to the light modulation element on a time series basis, as an example of the driving method of this exemplary embodiment.

The termination pulse having the same polarity as the discharge current which is produced at a time the applying of the DC voltage is terminated is aggressively applied. Thereby, the charges accumulated by applying the voltage in the writing step can be canceled out, and the texture change from the homeotropic texture to the planar texture is prevented from being hindered because voltage abruptly drops. At this time, if accumulation of charges caused by applying the voltage having the opposite polarity exceeds the canceling effect of the accumulated charges and voltage fluctuation caused by discharge occurs at a time the applying of the voltage is terminated, after all, the texture change of an image does not become responsive to the irradiation light. Therefore, it is necessary to appropriately adjust the applying time and the magnitude of the termination pulse for use.

Figure 6:
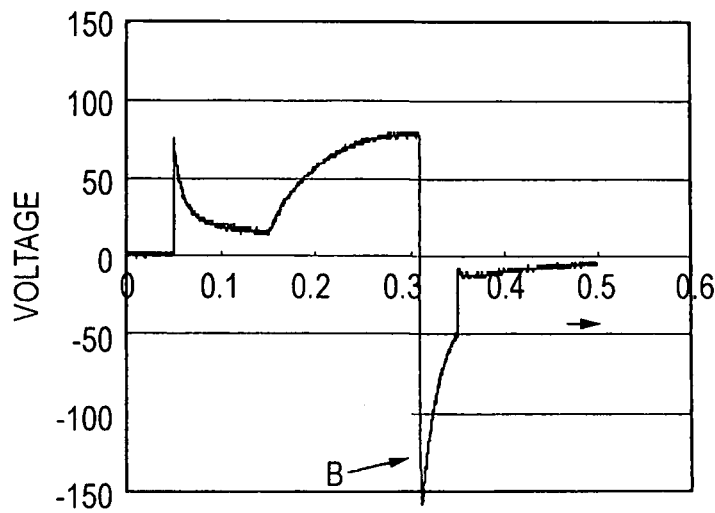
FIG. 6 is a graph to show the voltage applied to the light modulation layer (vertical axis) on a time series during an operation for a bright part, as the evaluation test result of an example.

Referring to FIG. 6 of a graph to show the evaluation result of an example described later, if the termination pulse is applied following the application of the bias voltage, a peak voltage which is amplified by the discharge current and which has the opposite polarity to the DC voltage applied until just before occurs in the light modulation layer 7 as indicated by arrow B in the graph.

If only a pulse voltage is applied without application of the light, the effect of the discharge current caused by the photocarrier is not produced. Thus, the termination pulse is not amplified and the light modulation layer 7 becomes the focal conic texture. Therefore, for the light modulation layer 7 having the single-polarity structure, the cholesteric liquid crystal 12 can be driven (switched) by light.

(Applied Voltage)

The specific magnitudes and application times period (pulse widths) of the bias voltage applied in the writing step and the voltage of the termination pulse applied in the pulse voltage applying step are generally determined according to various conditions such as the compositions, the thicknesses, and the layer configuration of the layers of the light modulation element 1, the intensity of the write light and the irradiation time period and a method of applying the write light by the light irradiation section 18, and the like and may be controlled appropriately in response to these conditions.

Referring to FIG. 11, it is necessary that the bias voltage applied in the writing step is equal to or larger than a voltage of the threshold value Vpf on the low voltage side and is equal to or lower than the threshold value Vfh on the high voltage side if the write light is not applied; and exceeds the threshold value Vfh on the high voltage side at the irradiation time in which the write light is applied to the light modulation layer 7. Adjustments may be made to the appropriate voltage and application time period so long as satisfying these conditions.

On the other hand, the termination pulse applied in the pulse voltage applying step is set to have the voltage magnitude and application time period for making it possible to resolve disorder of the waveform caused by amplification with discharge current, function as one independent pulse voltage, and change the texture of the light modulation layer 7 from the homeotropic texture to the planar texture. At this time, it is necessary that the voltage magnitude does not exceed the threshold value Vfh on the high voltage side if amplification with discharge current does not exist so that texture change is not caused in any other part (dark part) than the light irradiation part.

According to the termination pulse, a comparatively large pulse voltage having the opposite polarity to that of the DC current applied in the writing step is applied. It is desirable that move of photocarrier in the opposite direction to the writing step does not occur and the photocarrier is not be accumulated so that a discharge current does not occur or less occurs again after the application of the termination pulse is terminated. Therefore, the pulse width and the magnitude of the termination pulse may be controlled so that a peak of the discharge current does not appear on the side of the polarity of the DC voltage after the pulse voltage is applied.

While the light modulation element, its driving method and the driving apparatus according to the exemplary embodiment have been described in detail, it is to be understood that the invention is not limited thereto. In the exemplary embodiment, the display element for single-color image formation with the single light modulation layer only has been described as an example. However, the display element may have plural light modulation layers or plural other layers so as to be able to form a multicolor image, if necessary. In that case, light modulation layers capable of displaying at least the three primary colors of blue, green, and red may be deposited for providing a display element capable of forming a full color image.

In addition, those skilled in the art may conceive to change and modify the light modulation element of the exemplary embodiment, the driving method of the exemplary embodiment, or the driving apparatus of the exemplary embodiment appropriately in accordance with the known knowledge. If such change or modulation is made, such a change and modification is still in the scope of the invention so long as it includes the light modulation element of the invention, the driving method of the invention, or the configuration of the driving apparatus of the invention, of course.

EXAMPLES

The invention will be described more specifically with reference to examples. It should be noted that the invention is not limited to the following specific examples.
<Manufacturing of Display Element>

As a light modulation element to which the exemplary embodiment can be applied, a light modulation element 1 shown in FIG. 1 is prototyped and an image is written to verify comparative examples and the exemplary embodiment (examples) A description is given below with reference to FIG. 1.
(Manufacturing of Substrate on Organic Photoconductive Layer Side)

A polyethylene terephthalate (PET) film (manufactured by Toray Industries, Inc., high beam) 125 µm in thickness formed with ITO (surface resistance 300Ω/□) on one side is cut out as 50.8 mm (2 inch) square to form a substrate 4 and an electrode 6. Paint provided by dispersing a charge generation material (titanium phthalocyanine pigment) in a solution of dissolving revinyl butyral resin in butanol with a paint shaker is applied to the ITO (electrode 6) face and is dried so that dry film thickness becomes 0.2 µm by a spin coat method to form a charge generation layer 15.

Next, paint provided by dissolving polycarbonate resin and a charge transport material (benzidine N,N'-bis(3-methylphenyl-1,1'-biphenyl-4,4'-diamine) in monochlorobenzene is applied onto the charge generation layer 15 and is dried so that dry film thickness becomes 6 µm by a dip coat method to form a charge transport layer 14 to form an organic photosensitive layer 10 made up of the charge generation layer 15 and the charge transport layer 14.

Next, on the organic photosensitive layer 10, a polyvinyl alcohol aqueous solution in which carbon black pigment is dispersed is formed so that dry thickness becomes 1.2 µm by a spin coat method to form a colored layer 9. Further, as a layer above the colored layer 9, a two-pack urethane laminate agent diluted with butyl acetate (manufactured by Mitsui Takeda Chemical Corporation, A315/A50) is applied by a spin coat method so that dry film thickness becomes 1.0 µm to form a laminate layer 8 to manufacture a substrate on the organic photoconductive layer side.
(Manufacturing of Substrate on Light Modulation Layer Side)

As cholesteric liquid crystal, nematic liquid crystal (manufactured by Dainippon Ink Kagakukougyousha, RDP-83132) 85.5% by mass, dextrorotatory chiral agent (manufactured by Merck & Co., Inc, R811) 11.6% by mass, and dextrorotatory chiral agent (manufactured by Merck & Co., Inc, R1011) 2.9% by mass are mixed to prepare a material for reflecting red.

The cholesteric liquid crystal is emulsified in a sodium dodecylbenzenesulfonate aqueous solution of 0.25% by mass under a condition of nitrogen pressure 11.8 kPa (0.12 kgf/cm$^2$) using a film emulsifying device (manufactured by SPG Techno, Microkit) in which a ceramic porous film 4.2 µm in diameter is set. The obtained emulsion is in a state close to a monodisperse state as the particle size average of cholesteric liquid crystal drops is 14.9 µm and particle size standard deviation is 1.32 µm.

Next, the emulsion is let stand, the cholesteric liquid crystal drops are settled out, and emulsion condensed with supernatant liquid removed is obtained. Four mass parts of a 7.7%-by-mass aqueous solution of acid process bone gelatin (manufactured by Nippisha, jelly strength 314) are added to one mass part of the condensed emulsion, thereby obtaining a light modulation layer application liquid with the nonvolatile matter volume friction in the light modulation layer application liquid being about 0.15 and the cholesteric liquid crystal volume friction in the nonvolatile matter being about 0.70.

The same PET film with ITO electrode (High beam manufactured by Toray Industries, Inc.) as the one used as the substrate 4 and the electrode 6 in (Manufacturing of substrate on organic photoconductive layer side) described above is used as a substrate 3 and an electrode 5. The light modulation layer application liquid heated to 50° C. to place gelatin in a sol state is applied onto the ITO face side with an applicator with a micrometer with a gap adjusted so that the wet film thickness after the application becomes 90 µm.

After it is held for 15 minutes in a high-temperature, high-humidity chamber of 50° C./RH 90%, it is dried for 12 hours at room temperature, a PDLC layer about 12 µm in thickness with monodisperse cholesteric liquid crystal drops 15 µm in diameter dispersed in a polymer binder as a monolayer densely in a slightly flat shape is formed as a light modulation layer 7 to manufacture a substrate on the light modulation layer side.
(Bonding of Substrates)

The substrate on the organic photoconductive layer side and the substrate on the light modulation layer side thus manufactured are put on each other so that the light modulation layer 7 and the laminate layer 8 face each other and a part of an end face slightly shifts, and are bonded through a 100° C. laminator to obtain a light modulation element 1.

The functional films on the shifted end face are removed for exposing the ITO electrode so that both electrodes 5 and 6 can be brought into conduction from the outside of the finally obtained light modulation element 1.

The appearance of the obtained light modulation element 1 is that the light modulation layer 7 shows selective reflection of red.

A commercially available bagworm clip with leads is connected to both the electrodes 5 and 6 of the obtained light modulation element 1 as a contact terminal 19.

<Manufacturing of Dummy Element for Waveform Observation>

(Manufacturing of Organic Photoconductive Layer Dummy)

The substrate on the organic photoconductive layer side obtained in a similar manner to that of (Manufacturing of substrate on organic photoconductive layer side) described above and the same PET film with ITO electrode (High beam manufactured by Toray Industries, Inc.) as the one used as the substrate 4 and the electrode 6 in (Manufacturing of substrate on organic photoconductive layer side) described above are put on each other so that the laminate layer 8 and the ITO face are opposed to each other, and are bonded through a 100° C. laminator to manufacture an organic photoconductive layer dummy.

(Manufacturing of Light Modulation Layer Dummy)

As a layer above the PET film having ITO electrode (High beam manufactured by Toray Industries, Inc.) which is the same as the one used as the substrate 4 and the electrode 6 (in manufacturing of substrate on organic photoconductive layer side) described above, a two-pack urethane laminate agent diluted with butyl acetate (manufactured by Mitsui Takeda Chemical Corporation, A315/A50) is applied by a spin coat method so that dry film thickness becomes 1.0 µm to form a laminate layer.

The PET film with ITO electrode formed with the laminate layer and the light modulation layer 7 which is the substrate on the light modulation layer side obtained in a similar manner to that (in manufacturing of substrate on light modulation layer side) described above are put on each other so that the laminate layer and the light modulation layer face each other, and are bonded through a 100° C. laminator to manufacture a light modulation layer dummy.

<Manufacturing of Drive Evaluation System>

A high-speed and high-voltage amplifier (manufactured by Matsusada Precision Inc., HEOPT1B-60 model) is used as a voltage application section 17 and is connected to the contact terminal 19 of the light modulation element 1 to form a voltage application circuit.

On the other hand, a color light emitting diode light source (manufactured by CCS INC., HLV-3M-RGB model) is used as a light source. A light irradiation section 18 is manufactured so as to be able to irradiate the non-display surface of the light modulation element 1 (surface on the write side). The light irradiation section 18 can irradiate with blue light having a peak wavelength of 470 nm and a half band width of 20 nm.

A multichannel DAQ board (6713 model manufactured by National Instruments Corporation) and control software (LabVIEW manufactured by National Instruments Corporation) are used as the control circuit 16. Wiring is conducted so that the operation of the voltage application section 17 and the light irradiation section 18 can be controlled based on image data from a personal computer appropriately.

Although not shown in the figure, an integration spherical spectrometer (manufactured by Konica Minolta, Inc., CM2002 model) for measuring the light reflectivity of a display image of the light modulation layer 7 is attached to the surface of the display-surface side (substrate 3 side).

The light modulation element and the drive evaluation system containing the driving apparatus provided for the example and the comparison are thus manufactured.

<Manufacturing of Voltage Waveform Evaluation System>

In the light modulation element 1 having the light modulation layer 7 and the organic photosensitive layer 10 in one piece, the voltage applied to each layer cannot directly be observed. Then, as alternative means, organic photoconductive layer dummy and light modulation layer dummy in which the light modulation layer and the organic photosensitive layer are formed separately as mentioned above were connected in series so as to become the same connection as the drive evaluation system like an electric circuit to manufacture a waveform observation dummy element.

This waveform observation dummy element is placed or is connected with the voltage application section 17, the light irradiation section 18, and the control circuit 16 as with the drive evaluation system.

Further, an oscilloscope (Techtronics TDS1002 model) is connected through a high-voltage probe (Techtronics P6015A model) in parallel with the light modulation layer dummy to manufacture a voltage waveform evaluation system.

Comparative Example

In a comparative example, a voltage is applied and write light is applied so as to become a time series shown in the chart of FIG. 2. Specifically, first a 300-V bias voltage is applied to the electrodes 5 and 6 of the light modulation element 1 for 100 ms, blue light of 500 µW is applied for 160 ms with the bias voltage intact and just after, the voltage and the light are set to zero at the same time. The operation is performed in both the voltage waveform evaluation system (evaluation test 1) and the drive evaluation system (evaluation test 2). In evaluation test 1 using the voltage waveform evaluation system, the organic photoconductive layer dummy is irradiated with write light.

(Evaluation Test 1)

The voltage (division voltage) applied to the light modulation layer 7 is observed with the oscilloscope in the voltage waveform evaluation system. FIG. 4 is a graph to show the voltage applied to the light modulation layer 7 (vertical axis) on a time series.

From the graph of FIG. 4, it is seen that after bias voltage application is terminated, discharge current having the opposite polarity to the bias voltage occurs and a peak indicated by arrow A occurs and disorder of the waveform occurs.

(Evaluation Test 2)

Figure 5:
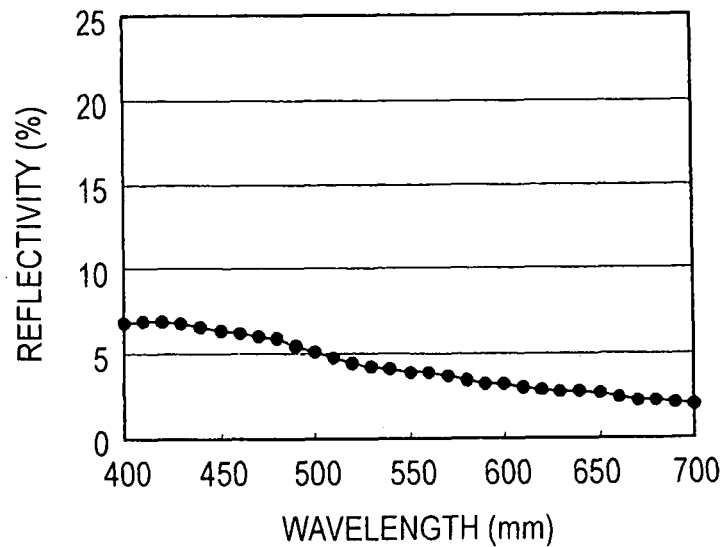
FIG. 5 is a graph to show spectral reflection spectrum of reflected light from the display-surface side of the light modulation element after a drive operation, as the evaluation test result of the comparative example.

The spectral reflection spectrum of reflected light from the display-surface side of the light modulation element 1 after drive operation is observed with the integration spherical spectrometer in the drive evaluation system. FIG. 5 is a graph to show the result and plots the wavelength of the reflected light on the horizontal axis and the reflectivity on the vertical axis.

In the light modulation element 1 in this comparative example, if a voltage of about 80 V is applied to the light modulation layer 7, it is sufficient for the cholesteric liquid crystal 12 to make texture change to the homeotropic texture, but texture change from the homeotropic texture to the planar texture is hindered because of the effect of the disorder of the waveform mentioned above and as seen from the graph of FIG. 5, the light modulation layer 7 is in a state where a color disappears, that is, in the focal conic texture.

Example

In the example, a test of applying a voltage and applying write light so as to become a time series shown in the chart of FIG. 3 assuming that the light irradiation part (bright part) of a write image and a test of applying only a voltage and applying no write light so as to become the time series shown in the chart of FIG. 3 assuming the light non-irradiation part (dark part) of a write image are conducted.

Specifically, in the bright part, first a 300-V bias voltage is applied to the electrodes 5 and 6 of the light modulation element 1 for 100 ms, blue light of 500 μW is applied for 160 ms with the bias voltage intact (writing step) and further a 200-V pulse voltage having the opposite polarity to the bias voltage is applied for 40 ms and just after, the voltage and the light are set to zero at the same time (pulse voltage applying step).

On the other hand, in the dark part, a 300-V bias voltage is applied as in the bright part, but the voltage application is continued for 260 ms without irradiating with light and further a 200-V pulse voltage having the opposite polarity to the bias voltage is applied for 40 ms and just after, the voltage is set to zero.

The operation in the bright part and the operation in the dark part described above are performed in both the voltage waveform evaluation system (evaluation test 1) and the drive evaluation system (evaluation test 2). In the evaluation test 1 using the voltage waveform evaluation system, the organic photoconductive layer dummy is irradiated with write light.

(Evaluation Test 1)

The voltage (division voltage) applied to the light modulation layer 7 is observed with the oscilloscope in the voltage waveform evaluation system. FIG. 6 is a graph to show the voltage applied to the light modulation layer 7 (vertical axis) on a time series in the operation assuming the bright part, and FIG. 7 is a similar graph in the operation assuming the dark part.

From the graph of FIG. 6, it is seen as compared with the graph of FIG. 4 that in the bright part, when a termination pulse is applied, it is amplified by the discharge current (see peak of arrow B) and disorder of the waveform after the termination pulse is applied disappears. The applied voltage becomes zero abruptly. That is, it is seen that when the termination pulse is applied, disorder of the waveform is canceled.

Figure 7:
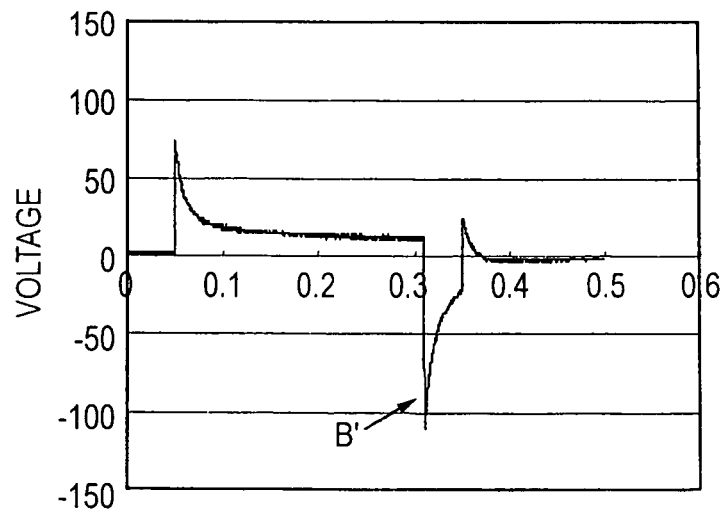
FIG. 7 is a graph to show the voltage applied to the light modulation layer (vertical axis) on a time series during an operation for a dark part, as the evaluation test result of the example.

From the graph of FIG. 7, it is seen that if irradiation with light is not executed, the termination pulse having an opposite polarity pulse is not amplified by the discharge current (see peak of arrow B').

(Evaluation Test 2)

Figure 8:
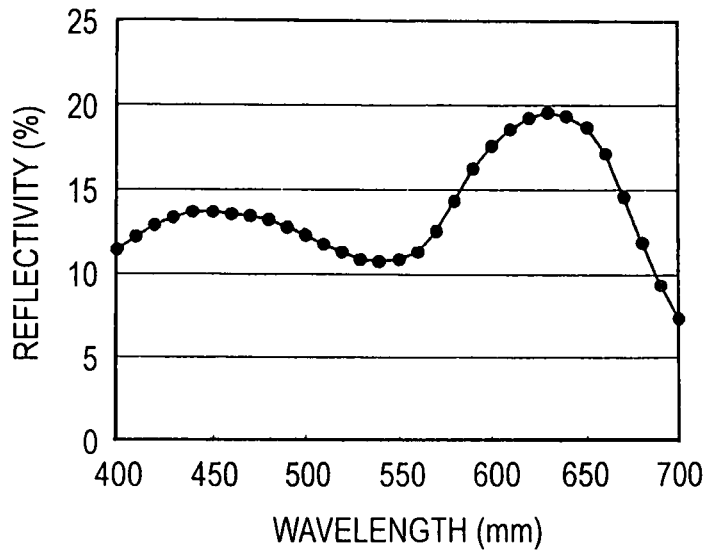
FIG. 8 is a graph to show spectral reflection spectrum of reflected light from the display-surface side of the light modulation element after the drive operation for the bright, part as the evaluation test result of the example.

The spectral reflection spectrum of reflected light from the display-surface side of the light modulation element 1 after drive operation is observed with the integration spherical spectrometer in the drive evaluation system. FIG. 8 is a graph to show the result in the operation assuming the bright part and FIG. 9 is a graph to show the result in the operation assuming the dark part; each plots the wavelength of the reflected light on the horizontal axis and the reflectivity on the vertical axis.

From the graph in FIG. 8, it is seen that the bright part is brought in a reflection state, that is, in the planar texture. It seems that since disorder of the waveform is canceled, the cholesteric liquid crystal 12 appropriately makes texture change from the homeotropic texture to the planar texture.

Figure 9:
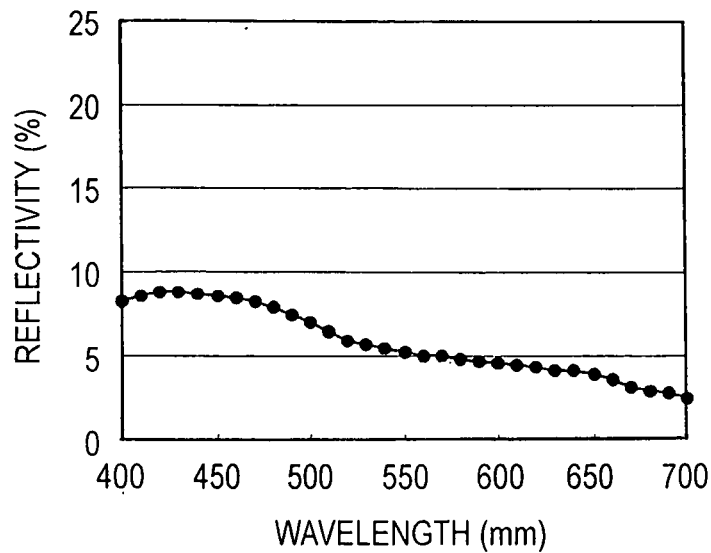
FIG. 9 is a graph to show spectral reflection spectrum of reflected light from the display-surface side of the light modulation element after the drive operation for a dark part, as the evaluation test result of the example.

On the other hand, from the graph in FIG. 9, it is seen that the dark part is brought in a state where a color disappears, that is, in the focal conic texture. In the light modulation element 1 in this example, it seems that it is insufficient for the cholesteric liquid crystal 12 to make texture change to the homeotropic texture only with the termination pulse. Since amplification with discharge current does not exist in the dark part, it seems that the cholesteric liquid crystal becomes in the focal conic texture intact.

Also in the voltage waveform evaluation system of evaluation test 1, the spectral reflection spectrum of the reflected light from the display-surface side of the light modulation element after drive operation gives a graph drawing a similar locus to those in FIGS. 8 and 9 as in the case of the drive evaluation system in both the bright part and the dark part.

As described above, in the example, to the organic photosensitive layer 10 of two-layer structure (single-polarity structure) as shown in FIG. 1, an image of selective reflection is able to be written in the bright part and an image of selective transmission is able to be written in the dark part.

What is claimed is:

1. A method for driving a light modulation element, wherein:
   the light modulation element comprises a pair of electrode layers, a display layer containing cholesteric liquid crystal that reflects or transmits light in response to a texture state of the cholesteric liquid crystal, and a photoconductive layer,
   the photoconductive layer comprises a charge generation layer and a charge transport layer deposited on each other without one of the charge generation layer and the charge transport layer sandwiching the other, and
   the display layer and the photoconductive layer are disposed between the electrode layers,
   the method comprising:
   applying write light to the light modulation element in accordance with an image to be displayed on the light modulation element while applying a DC voltage between the pair of electrode layers of the light modulation element;
   rapidly discharging accumulated charges and preventing a texture state of the cholestric liquid crystal from maintaining a focal conic texture by applying a pulse voltage having both an opposite polarity to and a pulse width shorter than the DC voltage applied so far between the pair of electrode layers with the write light being applied; and
   terminating the applying of the write light when the applying of the pulse voltage is terminated, wherein:
   the applying of the write light, the applying of the pulse voltage and the terminating of the applying of the write light are executed sequentially.

2. The method according to claim 1, further comprising:
   controlling the pulse width of the pulse voltage and a magnitude of the pulse voltage so that after the pulse voltage is applied, a peak of a discharge current does not appear on a side of the polarity of the DC voltage.

3. The method according to claim 1, wherein an intensity of the pulse voltage applied to a portion of the light modulation element to which the write light is applied is equal to that of the pulse voltage applied to another portion of the light modulation element to which the write light is not applied.

4. The method according to claim 3, wherein from a time when the applying of the pulse voltage is started to a time when the applying of the pulse voltage is terminated, an absolute value of a peak potential in the portion of the light modulation element to which the write light is applied is larger than that measured in the other portion of the light modulation element to which the write light is not applied.

5. A driving apparatus for a light modulation element, wherein:
   the light modulation element comprises a pair of electrode layers, a display layer containing cholesteric liquid crystal that reflects or transmits light in response to a texture state of the cholesteric liquid crystal, and a photoconductive layer, the photoconductive layer comprises a charge generation layer and a charge transport layer deposited on each other without one of the charge generation layer and the charge transport layer sandwiching the other, and the display layer and the photoconductive layer are disposed between the electrode layers, the apparatus comprising:

a voltage application unit that is configured to apply a voltage to the pair of electrode layers of the light modulation element;

a light application unit that is configured to apply write light to the light modulation element while the voltage application unit is applying the voltage; and a controller, wherein:

the controller is configured to control the voltage application unit to apply the voltage so that the voltage application unit applies a DC voltage to the light modulation element and subsequently rapidly discharges accumulated charges and prevents a texture state of the cholestric liquid crystal from maintaining a focal conic texture by applying a pulse voltage having both an opposite polarity to and a pulse width shorter than the DC voltage, and the controller is configured to control the light application unit so that the light application unit stops applying the write light with the applying of the pulse voltage terminated.

6. The apparatus according to claim 5, wherein the controller is configured to control the pulse width of the pulse voltage and a magnitude of the pulse voltage so that after the pulse voltage is applied, a peak of a discharge current does not appear on a side of the polarity of the direct voltage.

7. The apparatus according to claim 5, wherein an intensity of the pulse voltage applied to a portion of the light modulation element to which the write light is applied is equal to that of the pulse voltage applied to another portion of the light modulation element to which the write light is not applied.

8. The apparatus according to claim 7, wherein from a time when the applying of the voltage application unit starts to apply the pulse voltage to a time when the voltage application unit stops applying the pulse voltage, an absolute value of a peak potential in the portion of the light modulation element to which the write light is applied is larger than that measured in the other portion of the light modulation element to which the write light is not applied.

* * * * *